United States Patent [19]

Yamada

[11] Patent Number: 5,743,537
[45] Date of Patent: Apr. 28, 1998

[54] METAL LAMINATE GASKET WITH CONNECTING DEVICE

[75] Inventor: Kenji Yamada, Tokyo, Japan

[73] Assignee: Ishikawa Gasket Co., Ltd., Tokyo, Japan

[21] Appl. No.: 764,174

[22] Filed: Dec. 13, 1996

[30] Foreign Application Priority Data

Dec. 21, 1995 [JP] Japan ................................ 7-349910

[51] Int. Cl.$^6$ ...................................................... F16J 15/08
[52] U.S. Cl. ........................ 277/236; 277/232; 277/235 B
[58] Field of Search ................................ 277/231, 232, 277/233, 234, 235 B; 411/501, 502, 503, 173

[56] References Cited

U.S. PATENT DOCUMENTS

| | | | |
|---|---|---|---|
| 247,088 | 9/1881 | Maynz | 411/502 |
| 420,829 | 2/1890 | Platt | 411/501 |
| 1,951,168 | 3/1934 | Roth | 411/501 |
| 2,034,610 | 3/1936 | Dickson | 277/232 |
| 2,157,102 | 5/1939 | Victor et al. | 277/232 |
| 2,888,742 | 6/1959 | Stumbock | 277/235 B |
| 5,044,641 | 9/1991 | Belter | 277/235 B |
| 5,131,668 | 7/1992 | Uchida | 277/235 B |
| 5,330,200 | 7/1994 | Unseth | 277/235 B |
| 5,368,316 | 11/1994 | Miyaoh | 277/235 B |

*Primary Examiner*—Daniel G. DePumpo
*Attorney, Agent, or Firm*—Kanesaka & Takeuchi

[57] ABSTRACT

A metal laminate gasket of the invention is formed of a first metal plate, and a second metal plate situated under the first metal plate. The first plate includes a main portion and a hollow member extending substantially perpendicularly from the main portion, and the hollow member has a plurality of projections at one end thereof. The second plate has a hole with a size slightly larger than an outer size of the hollow member. When the first and second plates are assembled, the hollow member is fitted in the hole and the projections are bent around the hole under the second plate to thereby securely connect the first and second plates.

5 Claims, 1 Drawing Sheet

METAL LAMINATE GASKET WITH CONNECTING DEVICE

BACKGROUND OF THE INVENTION AND RELATED ART STATEMENT

The present invention relates to a metal laminate gasket with a connecting device for connecting metal plates for constituting the laminate gasket.

A metal laminate gasket is formed of a plurality of metal plates laminated together. Therefore, after the metal plates are laminated, the laminated plates must be connected together to prevent disassembly of the metal plates.

In case a gasket includes a grommet or turned portion, the metal plates may be connected together by the grommet or turned portion without using a connecting device. However, if the gasket does not have the grommet or turned portion, the metal plates must be connected together.

As one of the methods for connecting the metal plates, the metal plates laminated together are pressed to form a dent, and a bottom of the dent is enlarged. Also, the metal plates may be simply welded together by spot welding. In these methods, if a coating is formed on the metal plate, or the metal plates are not suitable for welding, these methods are not utilized.

In order to solve the above problems, a cylindrical portion is formed in one outer plate, and a hole for receiving the cylindrical portion is formed in the other plate. After the cylindrical portion is inserted into the hole, a portion of the cylindrical portion projecting outwardly from the other plate is bent or turned outwardly. This method does not require welding or pressing and can be made even if a coating is applied onto the metal plate. However, when the cylindrical portion is bent, the cylindrical portion may be cracked or broken, so that the metal plates may not be firmly connected together.

In U.S. Pat. No. 5,348,311, bending strips in one plate are inserted into holes of the other plate to connect the two plates together. In U.S. Pat. No. 5,368,316, a part of a cylindrical portion formed on one plate is inserted into a hole of another plate and is enlarged for press fitting. These patents operate properly, but a simple device for fixing the metal plates together has been still required.

In view of the prior art devices, the present invention has been made, and an object of the invention is to provide a metal laminate gasket with a connecting device for connecting a plurality of metal plates together by a simple connecting device.

Another object of the invention is to provide a metal laminate gasket as stated above, wherein the metal plates are connected together firmly without forming cracks to the connecting device.

Further objects and advantages of the invention will be apparent from the following description of the invention.

SUMMARY OF THE INVENTION

A metal laminate gasket of the invention is formed of a first metal plate, and a second metal plate situated under the first metal plate to constitute the metal laminate gasket. The first plate includes a main portion, and a hollow member extending substantially perpendicularly from the main portion. The hollow member has a plurality of projections at one end thereof. The second plate includes a hole with a size slightly larger than an outer size of the hollow member.

When the first and second plates are assembled, the hollow member is located in the hole and is enlarged to press fit in the hole. Then, the projections are bent around the hole under the second plate to thereby securely connect the first and second plates. In the present invention, the first and second plates are connected tightly and immovably by the hollow member and the projections.

The hollow member has a length corresponding to a length from an upper surface of the first plate to a lower surface of the second plate. The hollow member may have a cylindrical shape or a polygonal shape, and the hole has the same shape as in the hollow member. At least two, preferably more than tree projections are formed on the hollow portion.

DETAILED DESCRIPTION OF PREFERRED EMBODIMENTS

With reference to FIGS. 1-4, a first embodiment of the invention is explained.

Figure 1:
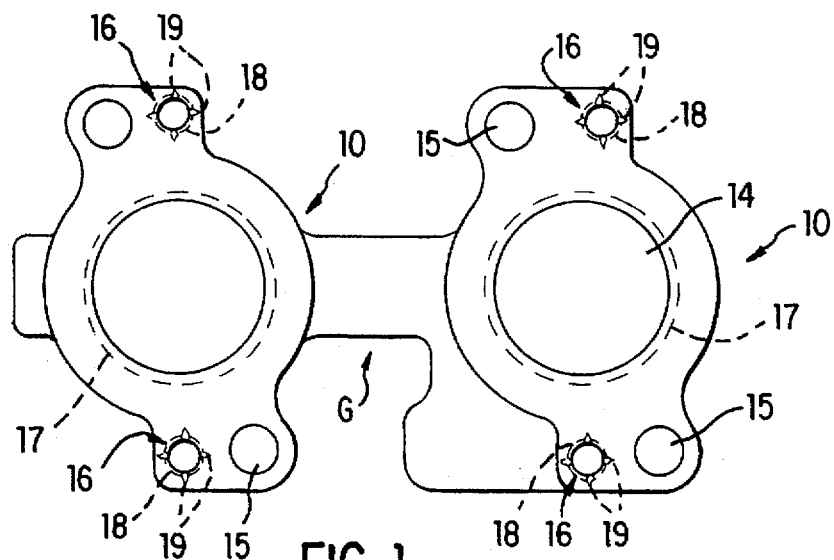
FIG. 1 is a plan view of a part of a manifold gasket of the invention.
Figure 2:
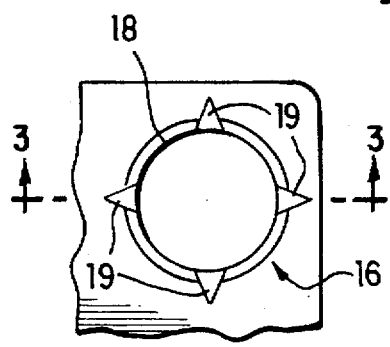
FIG. 2 is an enlarged bottom view for showing a connecting device of the manifold gasket.

A gasket G as shown in FIG. 1 is a manifold gasket formed of sealing sections 10 to be attached to exhaust ports of a cylinder head (not shown). The sealing section 10 includes an upper plate 11, a middle plate 12 and a bottom plate 13, which are laminated together to form a metal laminate gasket. The upper plate 11 of one sealing section 10 is integrally formed with the upper plate of the adjacent sealing section 10 to connect the sealing sections 10 together.

The sealing section 10 has an exhaust hole 14, bolt holes 15, and connecting devices 16 for connecting the plates 11, 12, 13 together. A bead 17 is formed on the middle plate 12 to seal around the exhaust hole 14.

The connecting device 16 includes a hollow member 18 with four projections 19 formed on the upper plate 11, and holes 20 formed in the middle and lower plates 12, 13. The hollow member 18 extends substantially perpendicularly from a main portion of the plate 11, and has a cylindrical shape. The projections 19 extend further outwardly from an end of the hollow member 18 to be equally spaced apart from each other. Each projection 19 has a shape similar to a triangle.

The holes 20 in the middle and lower plates have sizes substantially the same as the outer diameter of the hollow member 18. However, the holes 20 may be slightly larger than the outer diameter of the hollow member 18.

Figure 3:
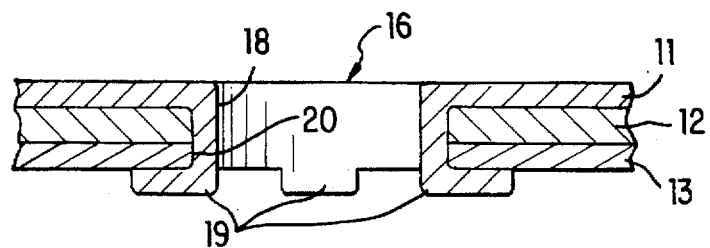
FIG. 3 is an enlarged sectional view taken along line 3—3 in FIG. 2.
Figure 4:
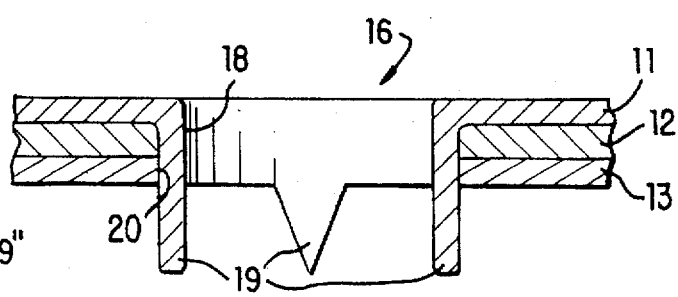
FIG. 4 is a sectional view of the connecting device before projections are bent.

In the invention, the plates 11, 12, 13 are laminated, and the hollow member 18 is inserted into the holes 20 of the middle and lower plates 12, 13 (FIG. 4). Then, the hollow member 18 is enlarged to press fit against the holes closely. Thereafter, the projections 19 are bent under the lower surface of the lower plate 13 (FIG. 3).

In the metal laminate gasket of the invention, the metal plates 11, 12, 13 are connected together by bending the projections 19 formed at the end of the hollow member 18.

Therefore, when the projections 19 are bent, cracks are not formed in the projections 19, unlike a cylindrical portion is bent laterally as a whole as used in a prior art connecting device. Further, after the hollow member 18 is enlarged, the projections 19 are bent, so that the plates are securely connected together.

In the gasket of the invention, since the projections 19 are formed to extend radially outwardly from the center of the hollow member 18, lateral movements of the plates are surely prevented. At least two projections 19 are formed on the hollow member 18, but it is preferable to form more than three projections in one hollow member 18.

In the invention, after the projections 19 are bent, the projections 19 are still located on the lower surface of the lower plate 13. However, since the connecting device 16 is located at a portion not affected by a manifold and a cylinder head (both not shown), the connecting device 16 does not affect the bead 17 or sealing mechanism around the exhaust hole 14.

In the invention, the connecting device 16 is formed independently. However, the connecting device 16 may be formed by utilizing bolt holes, oil holes and so on.

Figure 5:
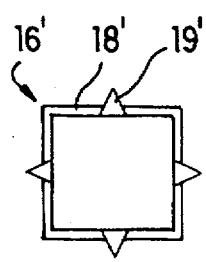
FIGS. 5 and 6 are bottom views of different embodiments of the connecting device of the invention.
Figure 6:
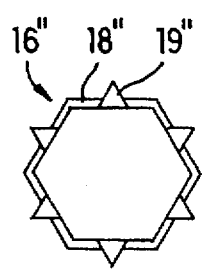

In the connecting device 16, the hollow member 18 has the cylindrical shape, but as shown in FIGS. 5, 6, the hollow members 18', 18" may have a rectangular shape or a polygonal shape. In this case, projections 19', 19" are formed on the respective linear sides for the hollow members 18', 18".

In the invention, the metal plates of the metal laminate gasket, i.e. cylinder head gasket, manifold gasket and so on, can be easily and surely connected together by the connecting device without troubles.

While the invention has been explained with reference to the specific embodiments of the invention, the explanation is illustrative and the invention is limited only by the appended claims.

What is claimed is:

1. A metal laminate gasket comprising, a first metal plate having a main portion and a hollow member extending substantially perpendicularly from the main portion, said hollow member having a polygonal shape with linear sides and a plurality of projections formed at one end of the hollow member to project from at least some of the linear sides, each of the projections having a bottom portion with a length less than that of the linear side and connected to one of the linear sides, and a second metal plate situated under the first metal plate to constitute the metal laminate gasket together with the first plate, said second plate having a hole in a polygonal shape with a size slightly larger than an outer size of the hollow member so that when the first and second plates are assembled, the hollow member is fitted in the hole and the projections are bent around the hole under the second plate to thereby securely connect the first and second plates.

2. A metal laminate gasket according to claim 1, wherein said hollow member has a length corresponding to a length from an upper surface of the first plate to a lower surface of the second plate.

3. A metal laminate gasket according to claim 2, wherein each of the projections has a triangular shape, one side of the projection in the triangular shape being integrally joined with one of the linear sides.

4. A metal laminate gasket, according to claim 3, wherein each of the hollow member and the hole has a hexagonal shape.

5. A metal laminate gasket according to claim 4, wherein each of the projections is connected to each of the linear sides.

* * * * *